(12) United States Patent
Kawamoto et al.

(10) Patent No.: US 10,377,367 B2
(45) Date of Patent: Aug. 13, 2019

(54) CONTROL DEVICE FOR HYBRID VEHICLE AND CONTROL METHOD OF THE SAME

(71) Applicant: JATCO Ltd, Fuji-shi, Shizuoka (JP)

(72) Inventors: Yoshinobu Kawamoto, Seoul (KR); Tomohiro Utagawa, Sagamihara (JP); Masayuki Miyazono, Isehara (JP)

(73) Assignee: JATCO LTD, Fuji-Shi (JP)

( * ) Notice: Subject to any disclaimer, the term of this patent is extended or adjusted under 35 U.S.C. 154(b) by 248 days.

(21) Appl. No.: 15/327,680

(22) PCT Filed: Feb. 18, 2015

(86) PCT No.: PCT/JP2015/054371
§ 371 (c)(1),
(2) Date: Jan. 20, 2017

(87) PCT Pub. No.: WO2016/013238
PCT Pub. Date: Jan. 28, 2016

(65) Prior Publication Data
US 2017/0203750 A1    Jul. 20, 2017

(30) Foreign Application Priority Data
Jul. 24, 2014 (JP) ................................. 2014-150761

(51) Int. Cl.
*B60W 20/10* (2016.01)
*B60K 6/485* (2007.10)
(Continued)

(52) U.S. Cl.
CPC ............. *B60W 20/10* (2013.01); *B60K 6/485* (2013.01); *B60K 6/543* (2013.01); *B60K 6/547* (2013.01);
(Continued)

(58) Field of Classification Search
CPC ................. B60W 20/10; B60W 20/30; B60W 2050/009; B60W 2510/085;
(Continued)

(56) References Cited

U.S. PATENT DOCUMENTS

2006/0247086 A1* 11/2006 Watanabe .............. B60K 6/365
475/208
2009/0248265 A1* 10/2009 Tabata ................... B60K 6/365
701/59
(Continued)

FOREIGN PATENT DOCUMENTS

JP   2006-321391   * 11/2006
JP   2006-321391 A   11/2006
(Continued)

*Primary Examiner* — Muhammad Shafi
(74) *Attorney, Agent, or Firm* — Foley & Lardner LLP (57) ABSTRACT

A control device for hybrid vehicle is configured to transmit a torque generated by an engine and a motor to a power transmission member according to a driving power request from a driver. The control device for hybrid vehicle includes motor control means and transmission capacity control means. The motor control means is configured to control an output from the motor according to the driving power request. The transmission capacity control means is configured to control a transmission capacity of the power transmission member. The transmission capacity control means is configured to increase the transmission capacity in consideration of a variation of the output from the motor when the output from the motor is increased based on the driving power request. The motor control means is configured to increase the output from the motor after the transmission capacity is increased in consideration of the variation of the output from the motor when the output from the motor is increased based on the driving power request.

7 Claims, 3 Drawing Sheets

(51) Int. Cl.
*B60K 6/543* (2007.10)
*B60W 10/08* (2006.01)
*B60K 6/547* (2007.10)
*B60W 10/06* (2006.01)
*B60W 10/107* (2012.01)
*B60W 10/115* (2012.01)
*F16H 61/662* (2006.01)
*B60W 20/30* (2016.01)
*B60W 20/19* (2016.01)
*B60W 50/00* (2006.01)

(52) U.S. Cl.
CPC ............ *B60W 10/06* (2013.01); *B60W 10/08* (2013.01); *B60W 10/107* (2013.01); *B60W 10/115* (2013.01); *B60W 20/19* (2016.01); *B60W 20/30* (2013.01); *F16H 61/66272* (2013.01); *B60W 2050/009* (2013.01); *B60W 2510/085* (2013.01); *B60W 2510/1025* (2013.01); *B60W 2540/10* (2013.01); *B60W 2710/083* (2013.01); *B60W 2710/086* (2013.01); *B60W 2710/1022* (2013.01); *B60W 2710/1088* (2013.01); *Y02T 10/6226* (2013.01); *Y02T 10/6286* (2013.01); *Y02T 10/7258* (2013.01)

(58) Field of Classification Search
CPC ... B60W 2710/1088; B60W 2710/083; B60W 2710/086; B60W 10/115; B60W 10/107; B60W 20/19; B60W 10/06; B60W 10/08; B60W 2710/1022; B60W 2540/10; B60W 2510/1025; B60K 6/547; B60K 6/485; B60K 6/543; F16H 61/66272; Y02T 10/6286; Y02T 10/7258; Y02T 10/6226
USPC .......................................................... 701/22
See application file for complete search history.

(56) References Cited

U.S. PATENT DOCUMENTS

2014/0210216 A1* 7/2014 Konishi .................. B60K 6/48
290/38 R
2015/0051767 A1* 2/2015 Mohri .................. B60L 11/005
701/22

FOREIGN PATENT DOCUMENTS

| JP | 2007-274782 | * 10/2007 |
| JP | 2007-274782 A | 10/2007 |
| JP | 2008-120166 A | 5/2008 |
| JP | 2014-101051 A | 6/2014 |

* cited by examiner

CONTROL DEVICE FOR HYBRID VEHICLE AND CONTROL METHOD OF THE SAME

TECHNICAL FIELD

The present invention relates to a control device for hybrid vehicle and a control method of the same.

BACKGROUND ART

JP2008-120166A discloses a hybrid vehicle that includes an engine and a motor. The hybrid vehicle generates an additional torque by the motor according to a request driving power to perform a motor assist. Torques generated by the engine and the motor allows the vehicle to run.

SUMMARY OF INVENTION

It is considered that, for the motor assist, increasing a transmission capacity in a power transmission member such as a transmission prevents slip in the power transmission member.

However, for the motor assist to increase an output from the motor, a variation of the output from the motor possibly results in an output larger than a target output. In such case, controlling the transmission capacity according to the target output possibly results in an insufficient transmission capacity for a torque actually input to the power transmission member, generating the slip in the power transmission member.

The present invention has been invented to solve the problems. An object of the present invention is to prevent the slip in the power transmission member during the motor assist.

A control device for hybrid vehicle according to a certain aspect of the present invention is a control device for hybrid vehicle configured to transmit a torque generated by an engine and a motor to a power transmission member according to a driving power request from a driver. The control device for hybrid vehicle includes motor control means configured to control an output from the motor according to the driving power request and transmission capacity control means configured to control a transmission capacity of the power transmission member, the transmission capacity control means is configured to increase the transmission capacity in consideration of a variation of the output from the motor when the output from the motor is increased based on the driving power request, and the motor control means is configured to increase the output from the motor after the transmission capacity is increased in consideration of the variation of the output from the motor when the output from the motor is increased based on the driving power request.

A control method of hybrid vehicle according to another aspect of the present invention is a control method of hybrid vehicle configured to transmit a torque generated by an engine and a motor to a power transmission member according to a driving power request from a driver. The control method of hybrid vehicle includes increasing a transmission capacity of the power transmission member in consideration of a variation of an output from the motor when the output from the motor is increased based on the driving power request; and increasing the output from the motor after the transmission capacity is increased in consideration of the variation of the output from the motor.

According these aspects, after the transmission capacity is increased in consideration of the variation of the output from the motor, the output from the motor increases. This ensures preventing the insufficient transmission capacity and preventing the slip in the power transmission member.

DESCRIPTION OF EMBODIMENTS

The following describes embodiments of the present invention by referring to the attached drawings.

Figure 1:
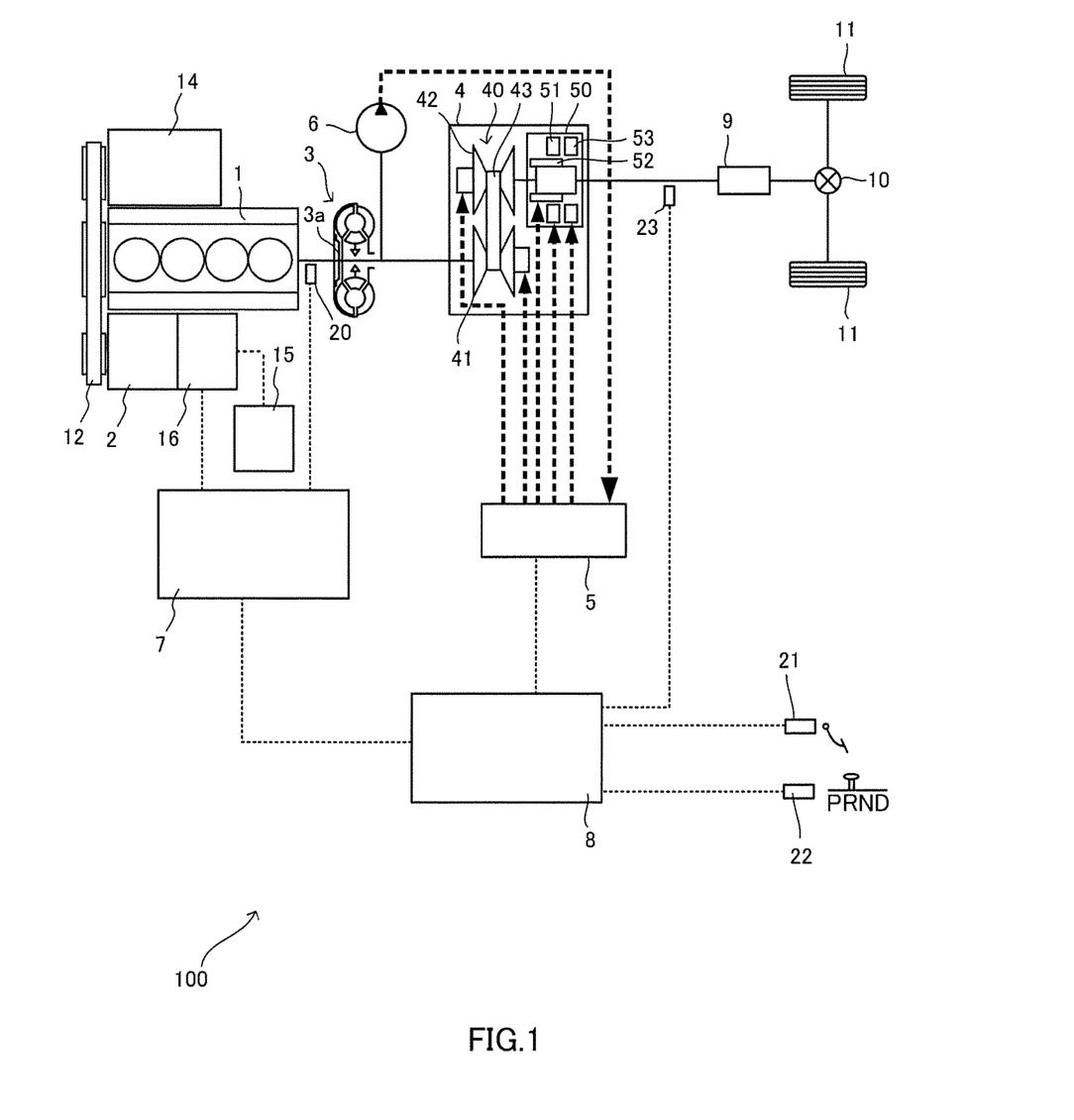
FIG. 1 is a schematic configuration diagram of a hybrid vehicle in the present embodiment.

FIG. 1 is a schematic configuration diagram of a hybrid vehicle 100 in the present embodiment.

The hybrid vehicle 100 includes an engine 1, a motor-generator 2, a torque converter 3, a transmission 4, a hydraulic control circuit 5, an oil pump 6, an engine controller 7, and a transmission controller 8. In the hybrid vehicle 100, a torque (hereinafter referred to as an engine torque Te) generated by the engine 1 is transmitted to wheels 11 through the torque converter 3, the transmission 4, a final reduction gear 9, and a differential gear 10. The hybrid vehicle 100 can perform a motor assist that transmits a torque (hereinafter referred to as a motor torque Tm) generated by the motor-generator 2 to an output shaft of the engine 1 via a belt 12 or a similar member. During the motor assist, the engine torque Te and the motor torque Tm are transmitted to the wheels 11.

The engine 1 transmits the generated engine torque Te to the wheels 11 to run the hybrid vehicle 100. Additionally, the engine 1 can transmit some of the engine torque Te to an air conditioner compressor 14 and the motor-generator 2 via the belt 12 or a similar member and can drive these members.

The motor-generator 2 has a function as an electric motor that receives electric power supply from a battery 15 to be rotatably driven and a function as a generator that is rotated by external force to generate electricity. The motor-generator 2 is coupled to the battery 15 via an inverter 16. For the motor assist, the motor-generator 2 serves as the electric motor. Meanwhile, during driven by the engine 1 or during execution of a regenerative control, the motor-generator 2 serves as the electric generator.

The torque converter 3 includes a lock-up clutch 3a. Fully engaging the lock-up clutch 3a directly couples an input shaft and an output shaft of the torque converter 3 and rotates the input shaft and the output shaft at an identical speed.

The transmission 4 includes a continuously variable transmission 40 and a sub-transmission mechanism 50.

The continuously variable transmission 40 includes a primary pulley 41, a secondary pulley 42, and a V belt 43. Controlling a hydraulic pressure (hereinafter referred to as a primary pulley pressure Ppri) supplied to the primary pulley 41 and a hydraulic pressure (hereinafter referred to as a secondary pulley pressure Psec) supplied to the secondary pulley 42 in the continuously variable transmission 40 changes a contact radius where the respective pulleys 41 and 42 are in contact with the V belt 43, thus changing a speed ratio. In the continuously variable transmission 40, a transmission torque capacity (transmission capacity) is controlled so as not to cause a belt slip. In the present embodiment, the transmission torque capacity is controlled by controlling the secondary pulley pressure Psec. An increase in the secondary pulley pressure Psec increases the transmission torque capacity.

The sub-transmission mechanism 50 is a transmission mechanism having two forward stages and one backward stage. The sub-transmission mechanism 50 includes a Ravigneaux type planetary gear mechanism that couples carriers of two planetary gears and a plurality of friction engaging elements 51 to 53 (a Low brake 51, a High clutch 52, and a Rev brake 53) that is coupled to a plurality of rotational elements which constitutes the Ravigneaux type planetary gear mechanism and changes these linking states. Adjusting the supplied hydraulic pressures to the respective friction engaging elements 51 to 53 to change the engaged/disengaged state of the friction engaging elements 51 to 53 changes a gear position of the sub-transmission mechanism 50.

In the transmission 4, changing the speed ratio of the continuously variable transmission 40 and the gear position of the sub-transmission mechanism 50 changes the speed ratio as the entire transmission 4.

The hydraulic control circuit 5 is constituted of a plurality of flow passages and a plurality of hydraulic control valves. The hydraulic control circuit 5 controls the plurality of hydraulic control valves based on a shift control signal from the transmission controller 8 to switch the supply passage for the hydraulic pressure. Additionally, the hydraulic control circuit 5 prepares a required line pressure PL from the hydraulic pressure generated by the oil pump 6 and supplies this line pressure PL to respective sites in the continuously variable transmission 40, the sub-transmission mechanism 50, and the torque converter 3. In the present embodiment, the secondary pulley pressure Psec in the continuously variable transmission 40 is equal to the line pressure PL.

To the transmission controller 8, a signal from an engine rotation speed sensor 20 which detects an engine rotation speed Ne, a signal from an accelerator position sensor 21 which detects an accelerator position APO, a signal from an inhibitor switch 22 which detects a position of a shift lever, a signal from a vehicle speed sensor 23 which detects a vehicle speed VSP, signals related to the engine torque Te and the motor torque Tm from the engine controller 7 in charge of the control of the engine 1 and the motor-generator 2, and a similar signal are input.

Figure 2:
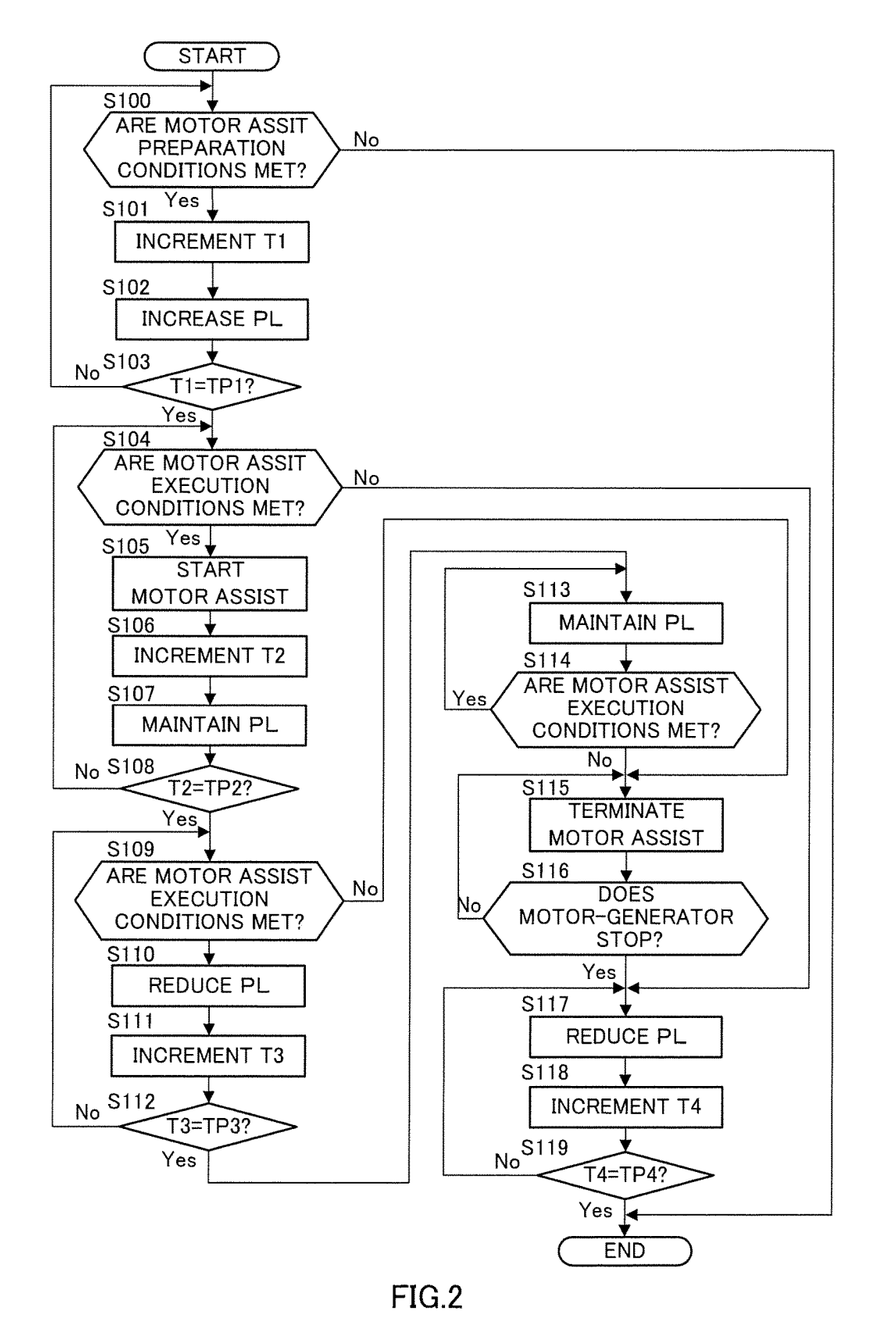
FIG. 2 is a flowchart describing a motor assist control.

The following describes the motor assist control with reference to the flowchart in FIG. 2. In an exemplary embodiment, the transmission controller 8 corresponds to a transmission capacity control means, and the engine controller 7 corresponds to a motor control means.

At Step S100, the transmission controller 8 determines whether motor assist preparation conditions are met. The motor assist preparation conditions are, for example, as follows.

(a) An increased amount ΔAPO of the accelerator position APO per unit time is larger than zero. (b) The signal from the inhibitor switch 22 is a D range. (c) The vehicle speed VSP is a predetermined vehicle speed V1 (50 km/h, for example) or less. (d) The engine rotation speed Ne is a predetermined rotation speed Ne1 (2000 rpm, for example) or less. (e) The lock-up clutch 3a is fully engaged.

When the conditions are all met, the transmission controller 8 determines that the motor assist preparation conditions are met. When any of the conditions is not met, the transmission controller 8 determines that the motor assist preparation conditions are not met. When the motor assist preparation conditions are met, the process proceeds to Step S101. When the motor assist preparation conditions are not met, the process at this time is terminated.

At Step S101, the transmission controller 8 increments a first timer value T1. When the process proceeds to Step S101 first in the process at this time, the transmission controller 8 starts counting by a first timer.

At Step S102, the transmission controller 8 increases the line pressure PL. The transmission controller 8 increases the line pressure PL so as to increase a first predetermined pressure P1 per unit time and controls the primary pulley pressure Ppri so as not to shift the continuously variable transmission 40. This increases the secondary pulley pressure Psec without shifting the continuously variable transmission 40 and increases the transmission torque capacity of the continuously variable transmission 40. The increase in the line pressure PL prepares for the start of motor assist and does not aim to perform the shift. Pressure-receiving areas of hydraulic chambers for the primary pulley 41 and the secondary pulley 42 differ, distances of pipe passages to the respective hydraulic chambers and pipe passage resistances differ, for example. Because of these or the like, increasing the line pressure PL stepwisely by enlarging the first predetermined pressure P1 fail to increase both pulley pressures Ppri and Psec while a differential pressure between the primary pulley pressure Ppri and the secondary pulley pressure Psec is maintained. This disrupts a balance in the differential pressure, possibly shifting the continuously variable transmission 40. Therefore, the first predetermined pressure P1 is set such that the differential pressure between the primary pulley pressure Ppri and the secondary pulley pressure Psec is maintained, the continuously variable transmission 40 is not shifted, and the transmission torque capacity increases.

At Step S103, the transmission controller 8 compares the first timer value T1 with a first predetermined value Tp1 (second predetermined time). The first predetermined value Tp1 is a time from when the transmission torque capacity of the continuously variable transmission 40 is started to increase until the transmission torque capacity becomes the transmission torque capacity at which the torque can be transmitted without causing the belt slip in the continuously variable transmission 40 when the maximum output is yielded at the motor-generator 2 to maximize the motor torque Tm. The first predetermined value Tp1 is set such that an actual pressure of the secondary pulley pressure Psec (line pressure PL) becomes a first predetermined hydraulic pressure Psec1 at which the belt slip does not occur when the maximum output is yielded at the motor-generator 2. That is, when the first timer value T1 becomes the first predetermined value Tp1, the actual pressure of the secondary pulley pressure Psec becomes the first predetermined hydraulic pressure Psec1. Even if the maximum output is yielded at the motor-generator 2, the belt slip does not occur in the continuously variable transmission 40. When the first timer value T1 becomes the first predetermined value Tp1, the process proceeds to Step S104. When the first timer value T1 does not become the first predetermined value Tp1, the process returns to Step S100 and the above-described processes are repeated.

At Step S104, the transmission controller 8 determines whether motor assist execution conditions are met. The motor assist execution conditions are, for example, as follows.

(a) The increased amount ΔAPO of the accelerator position APO per unit time is zero or more. (b) The signal from the inhibitor switch 22 is the D range. (c) The vehicle speed VSP is the predetermined vehicle speed V1 (50 km/h, for example) or less. (d) The engine rotation speed Ne is the predetermined rotation speed Ne1 (2000 rpm, for example) or less. (e) The lock-up clutch 3a is fully engaged.

When the conditions are all met, the transmission controller 8 determines that the motor assist execution conditions are met. When any of the conditions is not met, the transmission controller 8 determines that the motor assist execution conditions are not met. When the motor assist execution conditions are met, the process proceeds to Step S105. When the motor assist execution conditions are not met, the process proceeds to Step S117.

At Step S105, the engine controller 7 starts the motor-generator 2 to cause the motor-generator 2 to serve as the electric motor so as to start the motor assist. This increases the motor torque Tm and reduces the engine torque Te. The "starts the motor-generator 2" means that the current is supplied to rotate the motor-generator 2 from a state where a current is not supplied to the motor-generator 2, the rotation of the motor-generator 2 stops, and the motor torque Tm is zero. For example, the "starts the motor-generator 2" does not include the control of the motor-generator 2 to cause the motor-generator 2 to which the current is supplied and from which the motor torque Tm is output to further increase the motor torque Tm. It should be noted that, the increase in the motor torque Tm and the reduction in the engine torque Te are controlled in coordination such that a torque Tin input to the torque converter 3 becomes constant before and after the start of the motor assist. Thus, the motor-generator 2 is in charge of some of the torque Tin input to the torque converter 3 to reduce the required engine torque Te, thereby ensuring reducing a fuel injection quantity of the engine 1 and improving fuel efficiency.

Starting the motor-generator 2 possibly maximizes the output from the motor-generator 2 by a starting current. In the present embodiment, the large transmission torque capacity is set in advance to avoid the belt slip even if the maximum output is yielded from the motor-generator 2. Therefore, even if the motor assist is started and the motor-generator 2 is started, the belt slip does not occur in the continuously variable transmission 40.

At Step S106, the transmission controller 8 increments a second timer value T2. When the process proceeds to Step S106 first in the process at this time, the transmission controller 8 starts counting by a second timer.

At Step S107, the transmission controller 8 maintains the line pressure PL at the current line pressure PL.

At Step S108, the transmission controller 8 determines whether the second timer value T2 becomes a second predetermined value Tp2 (first predetermined time). The second predetermined value Tp2 means a time during which the starting current by the start of the motor-generator 2 converges. It should be noted that, the second predetermined value Tp2 may be a time in which a safety margin for the time during which the starting current converges is taken into consideration. When the second timer value T2 becomes the second predetermined value Tp2, the process proceeds to Step S109. When the second timer value T2 does not become the second predetermined value Tp2, the process returns to Step S104 and the above-described processes are repeated.

At Step S109, the transmission controller 8 determines whether the above-described motor assist execution conditions are met. When the motor assist execution conditions are met, the process proceeds to Step S110. When the motor assist execution conditions are not met, the process proceeds to Step S115.

At Step S110, the transmission controller 8 reduces the line pressure PL. The transmission controller 8 reduces the line pressure PL so as to reduce a second predetermined pressure P2 per unit time and controls the primary pulley pressure Ppri so as not to shift the continuously variable transmission 40. This reduces the secondary pulley pressure Psec without shifting the continuously variable transmission 40 and reduces the transmission torque capacity of the continuously variable transmission 40. The second predetermined pressure P2 is set such that the differential pressure between the primary pulley pressure Ppri and the secondary pulley pressure Psec is maintained, the continuously variable transmission 40 is not shifted, and the transmission torque capacity decreases. The transmission torque capacity after the reduction in the line pressure PL is set to be a minimum value of the transmission torque capacity at which the belt slip does not occur at a total torque of the current engine torque Te and the motor torque Tm. The line pressure PL is reduced so as the transmission torque capacity after the reduction in the line pressure PL to be such transmission torque capacity. It should be noted that, the line pressure PL may be set so as the transmission torque capacity after the reduction in the line pressure PL to be the transmission torque capacity found by adding the safety margin to the minimum value. Thus, the starting current has converge and when it is determined that the maximum output is not yielded at the motor-generator 2, setting the line pressure PL to the minimum value of the transmission torque capacity at which the belt slip does not occur eliminates the need for increasing the line pressure PL unnecessarily and ensures restraining a deterioration of fuel efficiency.

At Step S111, the transmission controller 8 increments a third timer value T3. When the process proceeds to Step S111 first in the process at this time, the transmission controller 8 starts counting by a third timer.

At Step S112, the transmission controller 8 determines whether the third timer value T3 becomes a third predetermined value Tp3. The third predetermined value Tp3 is a time until the transmission torque capacity of the continuously variable transmission 40 becomes the minimum value of the transmission torque capacity at which the belt slip does not occur in the continuously variable transmission 40 and is set in consideration of the variation of the motor torque Tm. The third predetermined value Tp3 is set such that the actual pressure of the secondary pulley pressure Psec (line pressure PL) becomes a second predetermined hydraulic pressure Psec2 at which the belt slip does not occur even if the motor torque Tm varies. When the third timer value T3 becomes the third predetermined value Tp3, the process proceeds to Step S113. When the third timer value T3 does not become the third predetermined value Tp3, the process returns to Step S109 and the above-described processes are repeated.

At Step S113, the transmission controller 8 maintains the line pressure PL at the current line pressure PL. Since the line pressure PL is maintained at the current line pressure PL, even if the motor torque Tm varies while the motor assist is in execution, the transmission torque capacity does not become insufficient and the belt slip does not occur.

At Step S114, the transmission controller 8 determines whether the above-described motor assist execution conditions are met. When the motor assist execution conditions are met, the process returns to Step S113 and the above-described processes are repeated. When the motor assist execution conditions are not met, the process proceeds to Step S115.

At Step S115, to terminate the motor assist, the engine controller 7 reduces the motor torque Tm and increases the engine torque Te. It should be noted that, the reduction in the motor torque Tm and the increase in the engine torque Te are controlled in coordination such that the torque Tin input to the torque converter 3 becomes constant before and after the end of the motor assist.

At Step S116, the engine controller 7 determines whether the motor-generator 2 stops. When the motor-generator 2 stops, the process proceeds to Step S117. When the motor-generator 2 does not stop, the process returns to Step S115 and the above-described processes are repeated.

At Step S117, the transmission controller 8 reduces the line pressure PL. The transmission controller 8 reduces the line pressure PL so as to reduce a third predetermined pressure P3 per unit time and controls the primary pulley pressure Ppri so as not to shift the continuously variable transmission 40. This reduces the secondary pulley pressure Psec without shifting the continuously variable transmission 40 and reduces the transmission torque capacity of the continuously variable transmission 40. The third predetermined pressure P3 is set such that the differential pressure between the primary pulley pressure Ppri and the secondary pulley pressure Psec is maintained, the continuously variable transmission 40 is not shifted, and the transmission torque capacity decreases.

At Step S118, the transmission controller 8 increments a fourth timer value T4. When the process proceeds to Step S118 first in the process at this time, the transmission controller 8 starts counting by a fourth timer.

At Step S119, the transmission controller 8 determines whether the fourth timer value T4 becomes a fourth predetermined value Tp4. The fourth predetermined value Tp4 is a time until the transmission torque capacity of the continuously variable transmission 40 becomes the minimum value of the transmission torque capacity at which the engine torque Te can be transmitted without generating the belt slip. The fourth predetermined value Tp4 is set such that the actual pressure of the secondary pulley pressure Psec (line pressure PL) becomes a third predetermined hydraulic pressure Psec3 at which the belt slip does not occur. When the fourth timer value T4 becomes the fourth predetermined value Tp4, the process at this time is terminated. When the fourth timer value T4 does not become the fourth predetermined value Tp4, the process returns to Step S117 and the above-described processes are repeated.

The values of the timers are reset when becoming the respective predetermined values or to terminate the process at this time.

Figure 3:
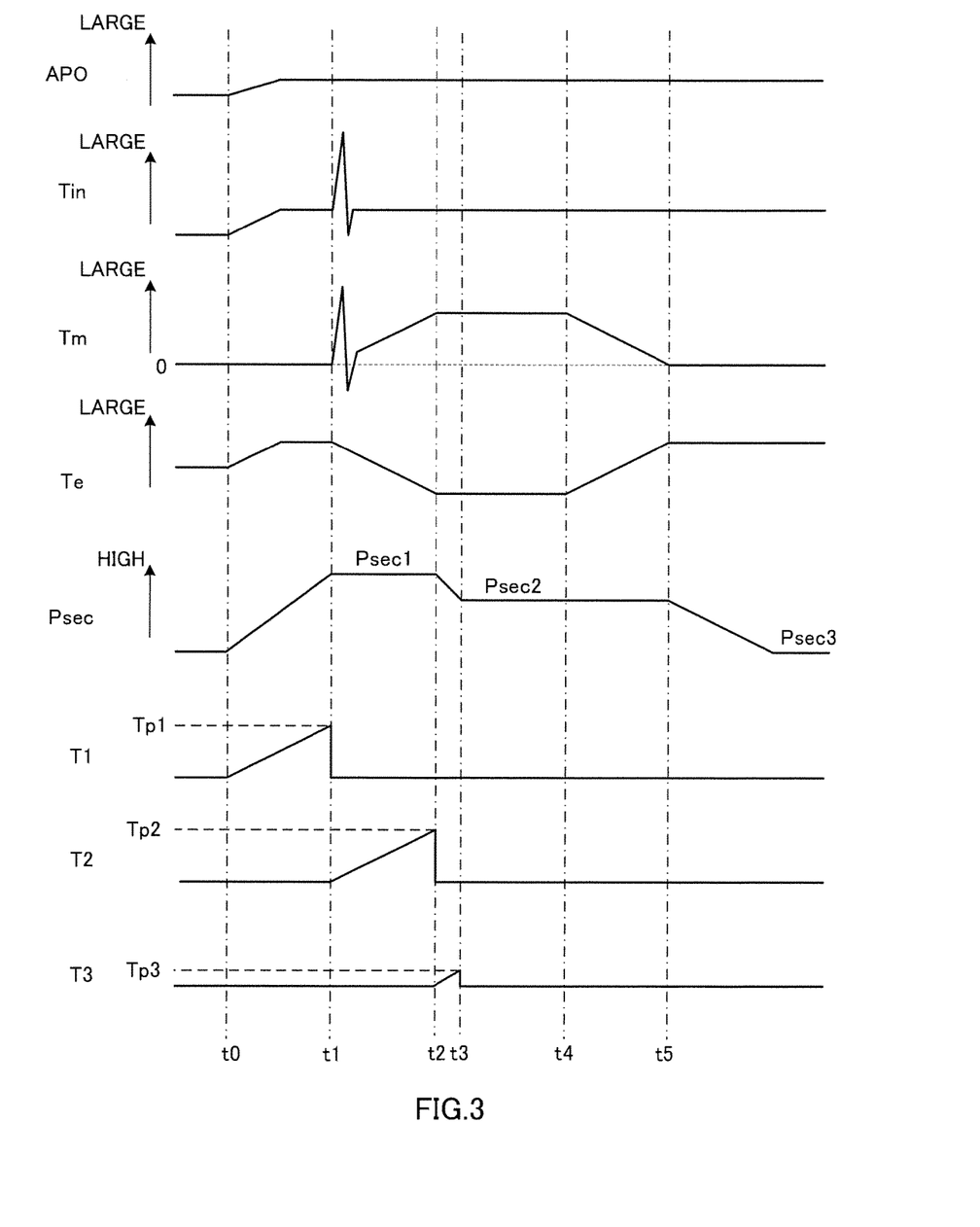
FIG. 3 is a timing chart describing the motor assist control.

The following describes the case where the motor assist control in the present embodiment is performed with reference to the timing chart in FIG. 3.

At a time t0, an accelerator pedal is further stepped down, the accelerator position APO increases, and motor assist conditions are all met. The engine torque Te increases, and the torque Tin input to the torque converter 3 also increases. The secondary pulley pressure Psec (line pressure PL) gradually increases, and the first timer starts counting.

At a time t1, when the first timer value T1 becomes the first predetermined value Tp1 and the secondary pulley pressure Psec becomes the first predetermined hydraulic pressure Psec1, the motor-generator 2 starts the motor assist. Starting the motor-generator 2 flows the starting current through the motor-generator 2 and the motor torque Tm temporarily increases and decreases. In the present embodiment, the secondary pulley pressure Psec is set to the first predetermined hydraulic pressure Psec1 so as to avoid the belt slip in the continuously variable transmission 40 even when the starting current flows through the motor-generator 2 and the motor torque Tm increases. Therefore, even if the starting current flows, the transmission torque capacity does not become insufficient in the continuously variable transmission 40 and therefore the belt slip does not occur in the continuously variable transmission 40. Starting the motor assist increases the motor torque Tm and reduces the engine torque Te. The second timer starts counting.

At a time t2, when the second timer value T2 becomes the second predetermined value Tp2, since the starting current converges, the secondary pulley pressure Psec is gradually reduced and the third timer starts counting.

At a time t3, when the third timer value T3 becomes the third predetermined value Tp3 and the secondary pulley pressure Psec becomes the second predetermined hydraulic pressure Psec2, the secondary pulley pressure Psec is held at the second predetermined hydraulic pressure Psec2. The second predetermined hydraulic pressure Psec2 is set in consideration of the variation of the motor torque Tm. Even if the secondary pulley pressure Psec is reduced, the belt slip does not occur in the continuously variable transmission 40.

At a time t4, when the motor assist execution conditions are not met, to terminate the motor assist, the motor torque Tm is reduced and the engine torque Te is increased.

At a time t5, when the motor-generator 2 stops, the secondary pulley pressure Psec is gradually reduced down to the third predetermined hydraulic pressure Psec3.

The following describes effects of the embodiment of the present invention.

To perform the motor assist, after the secondary pulley pressure Psec (line pressure PL) is increased and the transmission torque capacity of the continuously variable transmission 40 is increased in consideration of the variation of the motor torque Tm, the motor torque Tm is increased. This ensures preventing the insufficient transmission torque capacity to the torque input to the continuously variable transmission 40 and preventing the belt slip in the case where the motor assist is performed.

To start the motor-generator 2 for the motor assist, a variation width at the start of the motor-generator 2 is not always identical every time, and the variation width is also unknown. Therefore, to start the motor-generator 2 for the motor assist, the transmission torque capacity is increased such that the torque can be transmitted without causing the belt slip in the continuously variable transmission 40 even if the torque generated during the maximum output from the motor-generator 2 is input. After the transmission torque capacity is increased, the motor-generator 2 is started. This ensures preventing the belt slip at the start of the motor-generator 2.

After the motor-generator 2 is started, when the third timer value T3 becomes the third predetermined value Tp3, the transmission torque capacity is reduced down to the transmission torque capacity in which the variation of the motor torque Tm is taken into consideration. Increasing the line pressure PL to increase the transmission torque capacity increases a discharge pressure by the oil pump 6, worsening the fuel efficiency and electricity consumption. In the present embodiment, the transmission torque capacity is increased corresponding to the torque generated at the maximum output from the motor-generator 2 and then reduces the transmission torque capacity. This shortens the time during which the line pressure PL is high, thereby ensuring restraining the deterioration of the fuel efficiency and the electricity consumption.

At the start of the motor-generator 2, the transmission torque capacity is increased according to the torque generated when the starting current flows through the motor-generator 2. When the starting current converges, the transmission torque capacity is reduced. This ensures preventing the belt slip at the start of the motor-generator 2, shortening the time during which the line pressure PL is high, and restraining the deterioration of the fuel efficiency and the electricity consumption.

After the increase in the transmission torque capacity is started, when the first timer value T1 becomes the first predetermined value Tp1, the increase in the transmission torque capacity is completed. This ensures controlling the transmission torque capacity without using a sensor to detect the secondary pulley pressure Psec, controlling the motor assist control, and saving the cost.

In the case where the lock-up clutch 3a is not fully engaged and the torque Tin input from the torque converter 3 varies, when a gear position of the sub-transmission mechanism 50 is changed, for example, the friction engaging elements 51 to 53 cannot be set to an intended slip state, possibly causing a shift shock at the change of the gear position. In the present embodiment, the motor assist control is not performed in the case where the lock-up clutch 3a is not fully engaged (when the torque converter 3 is in a converter state and in the slip state). Therefore, the above-described shift shock can be prevented.

Although the embodiments of the present invention have been described above, the above embodiments are merely an illustration of some applicable examples of the present invention, and not intended to limit the technical scope of the present invention to the specific configurations of the above embodiments.

A hydraulic pressure sensor to detect the secondary pulley pressure Psec (line pressure PL) may be disposed, and the motor assist control may be performed based on a signal from the hydraulic pressure sensor. In this case, when the detected secondary pulley pressure Psec becomes the first predetermined hydraulic pressure Psec1 and motor assist start conditions are met for example, the motor assist is started. When the secondary pulley pressure Psec becomes the first predetermined hydraulic pressure Psec1 by the detection of the actual secondary pulley pressure Psec, the motor assist immediately starts. This ensures preventing the belt slip and starting the motor assist quickly, thereby ensuring improving the fuel efficiency.

Although the embodiment describes the case of the motor assist start, this may be applied to the case of increasing the motor torque Tm during the motor assist. In this case, after the transmission torque capacity of the continuously variable transmission 40 is increased (secondary pulley pressure Psec (line pressure PL) is increased) in consideration of the variation of the increasing motor torque Tm, the motor torque Tm is increased. Since the starting current does not flow in the case where the motor torque Tm is increased after the start of the motor-generator 2, the transmission torque capacity does not need to be increased according to the maximum output from the motor-generator 2. In such case, increasing the transmission torque capacity in consideration of the variation of the increasing motor torque Tm ensures preventing the belt slip and improving the fuel efficiency and the electricity consumption.

In the case where the transmission 4 is shifted while the secondary pulley pressure Psec (line pressure PL) is increased up to the first predetermined hydraulic pressure Psec 1 for motor assist control, the start of the motor-generator 2 may be delayed. In this case, even if the first timer value T1 becomes the first predetermined value Tp1, the motor-generator 2 does not start. Since the hydraulic pressure supplied to the transmission 4 varies during the shift, starting the motor assist during the shift possibly results in the insufficiency of the transmission torque capacity required to prevent the belt slip. Therefore, while the shift is performed, delaying the start of the motor-generator 2 and delaying the start of the motor assist can prevent the insufficient transmission torque capacity and prevent the belt slip. Specifically, after the shift is terminated, the motor-generator 2 is started to start the motor assist. This ensures preventing the belt slip during the shift and starting the motor assist quickly, thereby ensuring improving the fuel efficiency. It should be noted that, in the case where the secondary pulley pressure Psec (line pressure PL) varies except for the case of performing the shift, in the case where the hydraulic pressure of at least any one of the friction engaging elements 51, 52, and 53 is increased, for example, similarly delaying the start of the motor-generator 2 ensures preventing the belt slip.

It should be noted that, one controller or a plurality of controllers may perform the motor assist control. The respective processes in the motor assist control are not limited to be performed by the above-described controller and may be performed by another controller.

The present application claims a priority based on Japanese Patent Application No. 2014-150761 filed with the Japan Patent Office on Jul. 24, 2014, all the contents of which are hereby incorporated by reference.

The invention claimed is:

1. A control device for a hybrid vehicle configured to transmit a torque generated by an engine and a motor to a power transmission member according to a driving power request from a driver, the power transmission member being a continuously variable transmission, the control device for the hybrid vehicle comprising:
    a controller configured to control an output from the motor according to the driving power request and control a transmission capacity of the power transmission member, wherein:
    the controller is configured to:
        increase the transmission capacity such that a torque generated during a maximum output from the motor is transmittable and reduce the transmission capacity after an elapse of a first predetermined time from when the motor is started, when starting the motor; and
        start the motor after the transmission capacity is increased such that the torque generated during the maximum output from the motor is transmittable, when starting the motor.

2. The control device for the hybrid vehicle according to claim 1, wherein
    the maximum output is an output when a starting current flows through the motor, and
    the first predetermined time is a time during which the starting current converges.

3. The control device for the hybrid vehicle according to claim 1, wherein
    the controller is configured to complete increasing the transmission capacity at an elapse of a second predetermined time after a start of the increase in the transmission capacity.

4. The control device for the hybrid vehicle according to claim 3, wherein:
    the controller is configured to delay a timing to increase the output from the motor when a shift is performed in the continuously variable transmission before the elapse of the second predetermined time after the start of the increase in the transmission capacity, the controller being configured to delay the timing compared with a case where the shift is not performed.

5. The control device for the hybrid vehicle according to claim 4, wherein
the controller is configured to increase the output from the motor after the shift is terminated.

6. A control method of a hybrid vehicle configured to transmit a torque generated by an engine and a motor to a power transmission member according to a driving power request from a driver, the power transmission member being a continuously variable transmission, the control method of the hybrid vehicle comprising:
increasing the transmission capacity of the power transmission member such that a torque generated during a maximum output from the motor is transmittable, and reducing the transmission capacity after an elapse of a first predetermined time from when the motor is started, when starting the motor; and
starting the motor after the transmission capacity is increased such that the torque generated during the maximum output from the motor is transmittable, when starting the motor.

7. A control device for a hybrid vehicle configured to transmit a torque generated by an engine and a motor to a power transmission member according to a driving power request from a driver, the power transmission member being a continuously variable transmission, the control device for the hybrid vehicle comprising:
motor control means for controlling an output from the motor according to the driving power request; and
transmission capacity control means for controlling a transmission capacity of the power transmission member, wherein:
the transmission capacity control means
increases the transmission capacity such that a torque generated during a maximum output from the motor is transmittable and reduces the transmission capacity after an elapse of a first predetermined time from when the motor is started, when starting the motor, and
the motor control means starts the motor after the transmission capacity is increased such that the torque generated during the maximum output from the motor is transmittable, when starting the motor.

* * * * *